(12) United States Patent
Taglione et al.

(10) Patent No.: US 10,648,920 B2
(45) Date of Patent: May 12, 2020

(54) METHOD FOR DETECTING A DEFECT ON A SURFACE BY MULTIDIRECTIONAL LIGHTING AND ASSOCIATED DEVICE

(71) Applicant: FRAMATOME, Courbevoie (FR)

(72) Inventors: Matthieu Taglione, Saint Etienne en Bresse (FR); Clément Skopinski, Chalon sur Saone (FR); Gautier Caput, Dijon (FR)

(73) Assignee: Framatome, Courbevoie (FR)

( * ) Notice: Subject to any disclaimer, the term of this patent is extended or adjusted under 35 U.S.C. 154(b) by 0 days.

(21) Appl. No.: 16/091,682

(22) PCT Filed: Apr. 5, 2017

(86) PCT No.: PCT/EP2017/058162
§ 371 (c)(1),
(2) Date: Oct. 5, 2018

(87) PCT Pub. No.: WO2017/174683
PCT Pub. Date: Oct. 12, 2017

(65) Prior Publication Data
US 2019/0162674 A1     May 30, 2019

(30) Foreign Application Priority Data
Apr. 5, 2016   (FR) ...................... 16 52980

(51) Int. Cl.
*G01N 21/88*      (2006.01)
*G01N 21/47*      (2006.01)

(52) U.S. Cl.
CPC ....... *G01N 21/8806* (2013.01); *G01N 21/474* (2013.01); *G01N 21/4738* (2013.01); *G01N 2021/8816* (2013.01)

(58) Field of Classification Search
CPC ........... G01N 21/8806; G01N 21/4738; G01N 21/474; G01N 2021/8816
(Continued)

(56) References Cited

U.S. PATENT DOCUMENTS 5,313,542 A    5/1994 Castonguay
7,433,055 B2 * 10/2008 Schwarz .............. G01N 21/474
                                                          356/446
(Continued)

FOREIGN PATENT DOCUMENTS

FR         2858412 A1    2/2005
WO   WO2006038196 A1    4/2006

OTHER PUBLICATIONS

International Search Report of corresponding PCT application.

*Primary Examiner* — Isiaka O Akanbi
(74) *Attorney, Agent, or Firm* — Davidson, Davidson & Kappel, LLC

(57) ABSTRACT

A method for detecting a defect on a surface (12) by multidirectional lighting includes acquiring a plurality of images of the surface (12) using an optical device (14) having an optical axis, each image being acquired with a lighting of the surface along a lighting direction (E, E') given for each point of the surface (12) and an optical direction (O), the images being acquired with different lighting directions (E, E') or different combinations and/or with different optical directions (O); for each point, calculating a plurality of parameters, the parameters including coefficients of an equation characterizing the response of said point of the surface as a function of the lighting direction (E, E') and an observation direction (B, B'); and deducing from the calculated parameters whether the surface (12) has a defect at said point.

12 Claims, 2 Drawing Sheets

(58) Field of Classification Search
USPC .................. 356/445, 446, 237.2–237.6, 600
See application file for complete search history.

(56) References Cited

U.S. PATENT DOCUMENTS

| | | | |
|---|---|---|---|
| 8,103,491 B2 | 1/2012 | Steenhoek | |
| 8,280,144 B2* | 10/2012 | Subbiah | G01N 21/31 |
| | | | 250/227.11 |
| 2002/0196338 A1* | 12/2002 | Tham | G01N 21/8806 |
| | | | 348/131 |
| 2005/0180160 A1 | 8/2005 | Nelson | |
| 2006/0180775 A1* | 8/2006 | Paradis | G01N 21/8806 |
| | | | 250/559.42 |
| 2006/0274316 A1 | 12/2006 | Perquis | |
| 2009/0079987 A1 | 3/2009 | Ben-Ezra et al. | |
| 2015/0153276 A1 | 6/2015 | Kato | |
| 2015/0253129 A1* | 9/2015 | Ohnishi | G01B 11/24 |
| | | | 348/87 |
| 2015/0355106 A1* | 12/2015 | Horn | G01N 21/47 |
| | | | 356/237.5 |

\* cited by examiner

METHOD FOR DETECTING A DEFECT ON A SURFACE BY MULTIDIRECTIONAL LIGHTING AND ASSOCIATED DEVICE

The present invention relates to a method for detecting a defect on a surface.

It also relates to an associated detection device.

BACKGROUND

One current method consists of acquiring an image or a film of the surface. Said image or film is next viewed by an operator, who indicates the defects that he has identified.

However, the operator may not identify a defect due to lack of attention. Furthermore, the criteria making it possible to judge a defect are subjective, i.e., the definition of what constitutes a defect may vary depending on the operator.

One solution often implemented to offset these problems is to have the film or image viewed by several operators. Furthermore, surface image examples are used in order to show what is or is not a defect.

However, the examples shown are neither exhaustive nor reproducible.

In the event of a defect, experts are consulted. Many discussions between experts then take place, the experts not necessarily agreeing with one another.

SUMMARY OF THE INVENTION

The analysis of a surface may be time-consuming and complex.

An aim of the present disclosure is to resolve this drawback by providing a simple and safe method in order to detect a defect on a surface.

To that end, a method is provided for detecting a defect on a surface, the method including the following steps:
  acquiring a plurality of images of the surface using an optical device having an optical axis, each image being acquired with a lighting of the surface along a lighting direction given for each point of the surface and with the optical axis of the optical device along a given optical direction, the images being acquired with different lighting directions or different combinations of lighting directions and/or with different optical directions;
  for each point of the surface, calculating, from acquired images of a plurality of parameters, the parameters including coefficients of an equation characterizing the response of said point of the surface as a function of the lighting direction and an observation direction;
  deducing from the calculated parameters whether the surface has a defect at said point.

The detection method according to the invention may further include one or more of the following features, considered alone or according to any technically possible combination(s):
  the optical direction is the same for the plurality of images;
  the optical direction is substantially perpendicular to the surface;
  the lighting is done by a lighting device, the lighting device including a first number of light sources, the first number being greater than six, each light source having a different lighting direction, for each acquired image, a single light source or a defined combination of sources being illuminated, the single light source or combination being different for each acquired image;
  the light sources have an identical lighting intensity;
  the light sources are arranged in a half-sphere surrounding the surface;
  the lighting device includes one or several light sources that are capable of moving in a first number of positions relative to the surface;
  for each point of the surface, the calculation of the parameters includes the following steps:
    defining a quantity evolving as a function of the acquired images,
    choosing a model of the surface depending on the lighting direction(s) and/or the observation direction for the evolution of the quantity, the model including the coefficients, and
    calculating coefficients by regression of the evolution of the quantity;
  the quantity corresponds to the gray intensity of the point of the surface, the model depending on the lighting direction;
  a defect is detected at said point when at least one parameter at said point is not comprised in a defined interval;
  a defect is detected at said point when at least one parameter at said point is not comprised in an interval centered around the mean value of said parameter over the set of points of the surface; and
  a defect is detected at said point when at least one parameter at said point differs from a value chosen as detection threshold relative to the background noise of said parameter at an adjacent point, the surface not having a defect at the adjacent point.

A device for detecting a defect on a surface is also provided, the detection device including:
  an optical device having an optical axis, the optical device being able to acquire an image of the surface along a given optical direction,
  a lighting device having several different lighting directions, and
  an electronic calculating device, the electronic calculating device being configured to:
    acquire a plurality of images of the surface via the optical device, each image being acquired along the given optical direction with different lighting directions or different combinations of lighting directions for each image,
    for each point of the surface, calculate, from acquired images, a plurality of parameters, the parameters including coefficients of an equation characterizing the response of said point of the surface as a function of the lighting direction and an observation direction; and
    deduce from the calculated parameters whether the surface has a defect at said point.

BRIEF SUMMARY OF THE DRAWINGS

The invention will be better understood using the following description, provided solely as an example and done in reference to the appended figures, in which.

DETAILED DESCRIPTION

Figure 1:
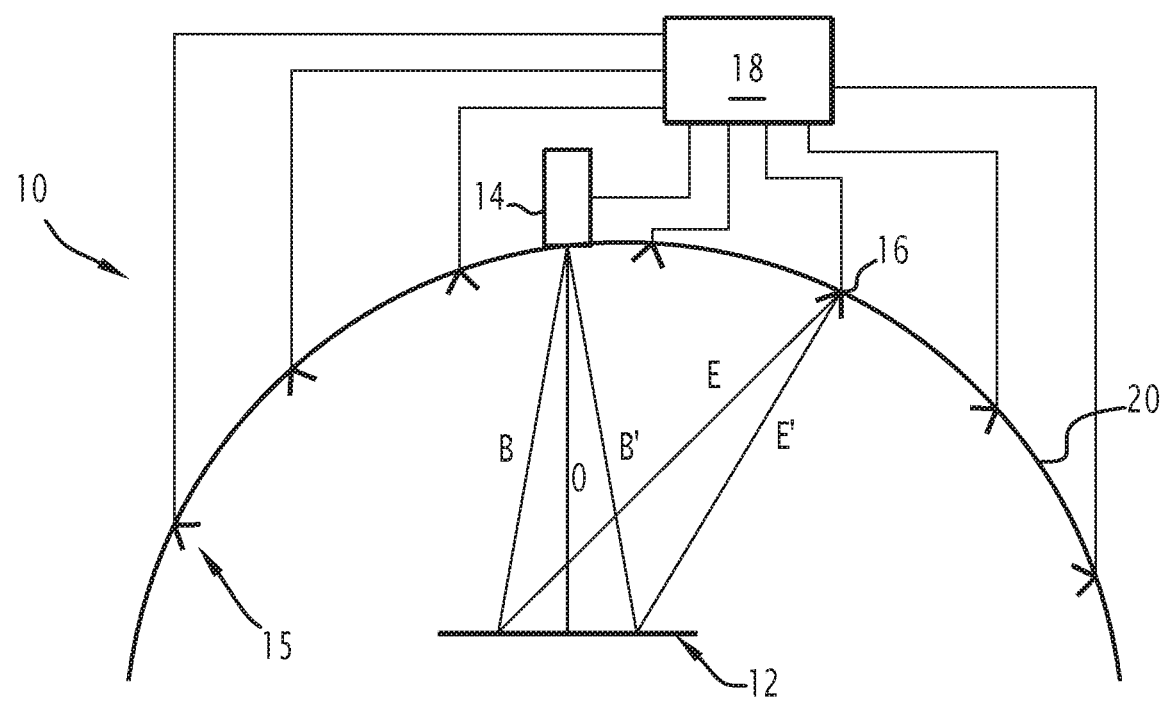
FIG. 1 is a schematic view of an example device used in the detection method according to an embodiment of the invention.

An example device 10 for detecting a defect on a surface 12 is shown in FIG. 1.

The detection device 10 includes an optical device 14, a lighting device 15 including a first number of light source(s) 16 and an electronic calculating device 18.

The optical device 14 has an optical axis aligned with a given optical direction O. It has an acquisition field.

The optical device 14 is able to acquire an image of the surface 12 along the given optical direction O. The acquisition field coincides with the surface 12 to be inspected, such that the acquired image represents the surface 12.

For each point of the surface, an observation direction B, B' is defined between the optical device 14 and the point of the surface 12.

The acquisition field here is fixed.

The optical direction O is typically substantially perpendicular to the surface 12. Alternatively, the optical direction O is not substantially perpendicular to the surface 12.

The optical device 14 is for example a camera.

Alternatively, the acquisition field coincides with only part of the surface 12 and is able to move relative to the surface 12 so as to be able to acquire all of the surface 12 in several parts.

Each acquired image is made up of a matrix of pixels with size i*j, with i the number of horizontal lines and j the number of vertical lines of the matrix, with at least one of the two parameters (i,j) greater than 1. The pixel is for example a rectangle with size denoted h*L, with h being its height and L being its width. The height h is equal to the width L. Alternatively, the height is different from the width.

Hereinafter, "point of the surface" indifferently refers to a pixel of an acquired image or part of the surface acquired in a pixel.

The light sources 16 are capable of lighting the surface 12.

For each point of the surface, the light sources 16 each have a given lighting direction E, E' connecting the light source to the point of the surface 12. The lighting direction is different for each light source.

The light sources 16 are typically arranged in a half-sphere 20 surrounding the surface 12.

The first number is for example greater than six, more particularly greater than twenty. The first number is for example between 32 and 128, more particularly equal to 96.

The light sources 16 are for example light-emitting diodes (LED).

They may be turned off or on. They are configured to be able to be turned on independently of one another.

The light sources 16 typically have an identical lighting intensity.

Alternatively, the lighting device 15 includes one or several light sources that are capable of moving, for example on the half-sphere 20, in a first number of positions relative to the surface.

Alternatively, the lighting device 15 includes one or several lights that may not be identical. When the lighting device is fully turned on, this for example provides nonhomogeneous lighting of the acquired surface. The acquisition system and the surface have a relative movement.

The electronic calculating device 18 is for example a computer, a calculator, a computing module, at least one programmable logic component, such as an FPGA (Field-Programmable Gate Array), or at least one dedicated integrated circuit such as ASICs (Application-Specific Integrated Circuits).

The electronic calculating device 18 is for example connected to the optical device 14 and the lighting device 15.

The electronic calculating device 18 is able to turn each of the light sources 16 on or off independently of one another.

The electronic calculating device 18 is further provided to trigger the acquisition of at least one image of the surface by the optical device 14.

It is thus configured to drive the acquisition of a plurality of images of the surface by the optical device 14, each image being acquired along the given optical direction O and with a single light source or a defined combination of different illuminated unique sources for each image.

For each point of the surface, the electronic calculating device 18 is configured to calculate, from acquired images, a plurality of parameters, the parameters including coefficients of an equation characterizing the response of said point of the surface as a function of the lighting direction and an observation direction, then to deduce from the calculated parameters whether the surface has a defect at said point.

This last point is described in detail below in connection with the method for detecting a defect.

Figure 2:
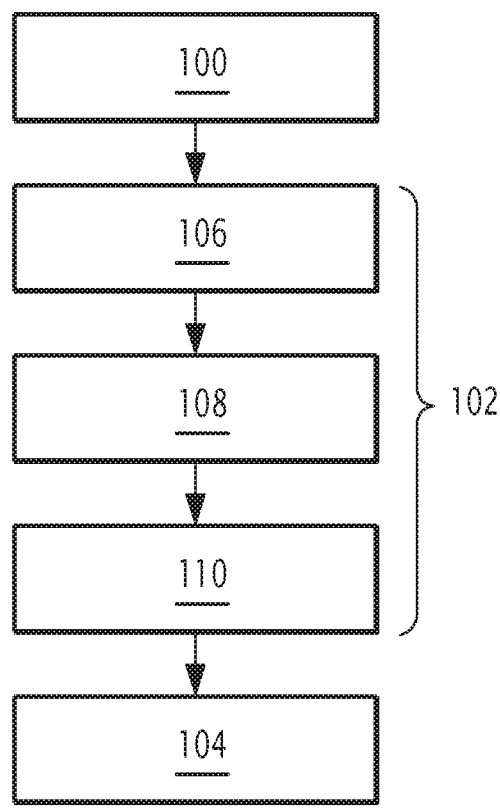
FIG. 2 is a diagram of steps of an embodiment of the method of the invention.

A method for detecting a defect in a surface will now be described in light of FIG. 2.

The method is carried out here by the device previously described, more specifically using the electronic calculating device 18.

The method comprises the following steps:
acquisition 100,
calculating parameters 102, and
deducing the presence of a defect 104.

Figure 3:
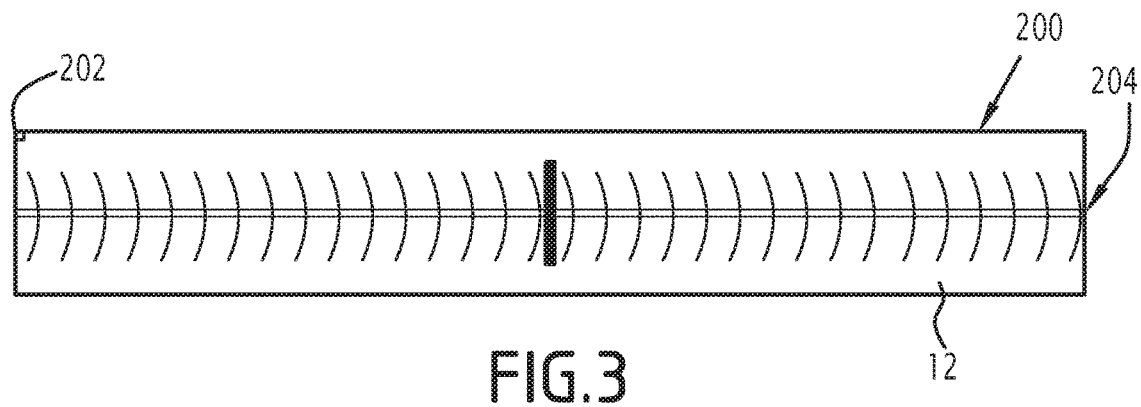
FIG. 3 is an example image of the surface on which the detection method is applied.

During the acquisition 100, a plurality of images 200 of the surface is acquired by the optical device 14. One such image is shown in FIG. 3.

Each image 200 is acquired with a lighting of the surface 12 along a given lighting direction E, E' for each point of the surface and with the optical axis of the optical device 14 along a given optical direction O.

The images 200 are acquired with different lighting directions E, E' or combinations of lighting directions.

Alternatively, the images 200 are acquired with different optical directions O.

Alternatively, the images 200 are acquired with different lighting directions E, E' or combinations of lighting directions and with different optical directions O.

In the illustrated embodiment, the lighting directions E, E' differ for each acquired image and the optical direction O is invariable and substantially perpendicular to the surface 12.

For each acquired image, a unique light source or a defined combination of unique sources 16 of the lighting device is lighted, the unique light source or the combination being different for each acquired image.

The set of light sources or combinations is lighted in turn, so as to acquire one image per light source or per combination. Alternatively, certain sources or combinations are not lighted.

Then, during the calculation of parameters 102, for each point 202 of the surface, i.e., here for each pixel of the acquired images, a plurality of parameters are calculated from the acquired images.

The parameters are calculated from coefficients of an equation characterizing the response of said point of the surface as a function of the lighting direction E, E' and an observation direction B, B'.

For each point 202 of the surface 200, the calculation of the parameters 102 here includes the following steps:
defining a quantity 106,
choosing a model 108, and
calculating coefficients 110.

During the definition of a quantity 106, a quantity evolving as a function of the acquired images is defined.

For example, the quantity here is the gray intensity of the point of the surface, the gray intensity being variable depending on the acquired images.

In parallel, a model depicting the evolution of the quantity is chosen 108. The model depends on the lighting direction(s) E, E' and/or the observation direction B, B'. The model includes coefficients.

Here the model depends solely on the lighting direction. It for example assumes the following form: $G(E)=a_0 \times D_u^2 + a_1 \times D_v^2 + a_2 \times D_u \times D_v + a_3 \times D_u + a_4 \times D_v + a_5$, with G the quantity, E the lighting direction, $a_0, a_1, a_2, a_3, a_4$ and $a_5$ the coefficients and $D_u$ and $D_v$ being the coordinates of the vector connecting the lighting source to the point of the surface.

The coefficients $a_0, a_1, a_2, a_3, a_4$ and $a_5$ here are undetermined.

Then, during the calculation of the coefficients 110, an application of the quantity on the model is done so as to calculate the values of $a_0, a_1, a_2, a_3, a_4$ and $a_5$.

The parameters here are equal to the coefficients $a_0, a_1, a_2, a_3, a_4$ and $a_5$ thus calculated.

For each point of the surface, the same quantity and the same model are defined. Thus for each point of the surface, parameters $a_0, a_1, a_2, a_3, a_4$ and $a_5$ are obtained. One for example obtains a map of the surface showing the values of the parameters for each point of the surface.

Figure 4:
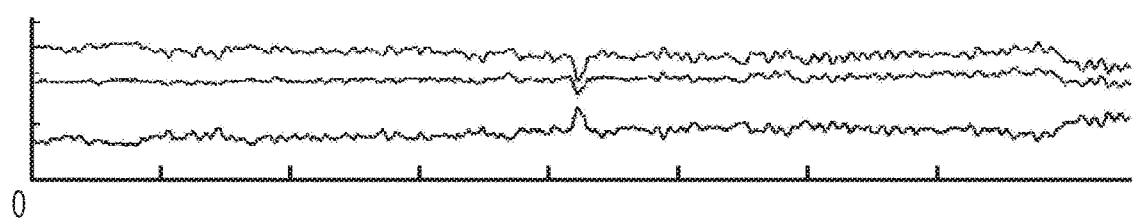
FIG. 4 is an example of the evolution of three parameters on a line of the surface of FIG. 3.

FIG. 4 shows the evolution of three parameters along the line 204 of points of the surface shown in FIG. 3.

Alternatively, the parameters are other values calculated from the coefficients.

When deducing the presence of a defect 104, it is deduced from the calculated parameters whether the surface has a defect at said point.

Figure 6:
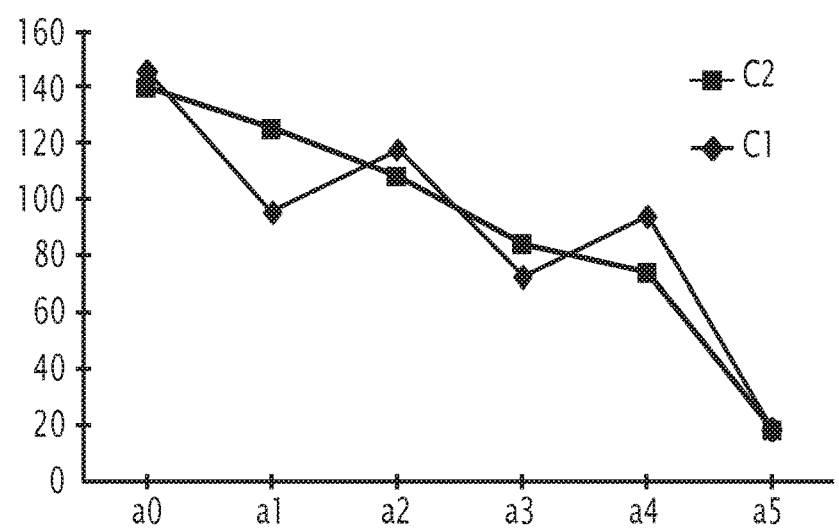
FIG. 6 is an example of parameters at a point having a defect and a point not having a defect.

In FIG. 6, for example, the parameters are shown with the curve $C_1$ at a point not having a defect and with the curve $C_2$ at a point having a defect.

The result obtained in step 104 for each point is for example a Boolean showing, in a binary manner, whether a defect is detected at said point.

Figure 5:
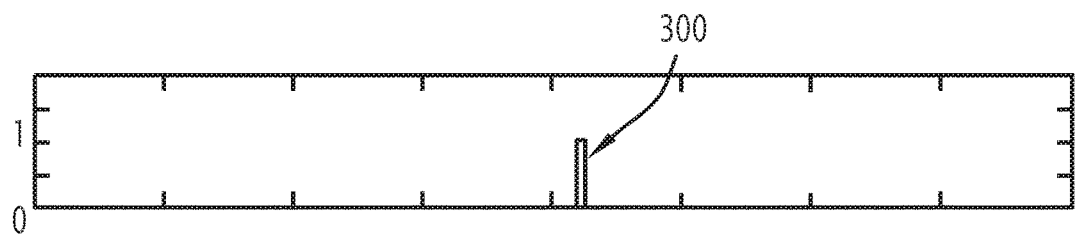
FIG. 5 is an example defect detection on the surface of FIG. 3.

FIG. 5 shows the Boolean along the line 204: if the Boolean is equal to 0, no defect is detected; if the Boolean is equal to 1, a defect is detected.

Thus, in FIG. 5, a single defect 300 is detected and extends over several adjacent points.

One or several criteria are used to deduce the presence of a defect from the parameters. These criteria are described below and are used alone or in combination in order to detect a defect. For example, a defect is detected when at least two of the criteria are validated.

A first criterion is that a defect is detected at said point when at least one parameter at said point is not comprised in an interval.

More particularly, the interval is centered around the mean value of said parameter over the set of points of the surface.

Alternatively, the interval is a given interval.

Alternatively, a defect is detected at said point when at least a given number of parameters at said point are not comprised in a respective interval.

A second criterion is that a defect is detected at said point when at least one parameter at said point differs from a value chosen as detection threshold relative to the background noise of said parameter at an adjacent point, the surface not having a defect at the adjacent point.

Thus, the surface is analyzed from one to the next.

It is then appropriate to define at least a first point of the surface for which a defect is not present.

Alternatively, the electronic calculating device 18 considers that a location of the surface is free of defects and, from one to the next, detects defects in the surface. If the result is deemed unacceptable, for example, if a majority of the surface is detected as having a defect, then the step is reiterated considering that another location, different from the previous one, is free of defects.

A third criterion is based on the geometry of a signal.

The signal here is the evolution of one or several parameters over a defined set of points. The points of the set here are adjacent. The set of points is for example a zone centered on a central point.

Patterns are defined corresponding to cases in which a defect is detected and/or in which no defect is detected. The shape of the signal is compared to the patterns, so as to decide whether a defect is detected. The defect is detected at the central point, in a zone including the central point and included in the set of points or in the set of points.

Thus, for each point of the surface, it is deduced from the parameters whether a defect is present.

This is for example able to be depicted on a binary map of the surface in order to view the defects easily.

Alternatively, the light sources 16 do not have an identical lighting intensity. A calibration of the device is then done.

In another embodiment, the optical direction of the optical device varies, the surface and a lighting source remaining stationary between each acquired image. Alternatively, the optical direction and the lighting direction are movable relative to the surface.

Alternatively, the calculation of the parameters 102 is based on another mathematical model such as the bidirectional reflectance distribution function (BRDF) or the discrete modal decomposition (DMD) or the polynomial texture mapping (PTM).

The direct deduction from parameters calculated from acquired images in particular makes it possible to do away with the susceptibility to the presence of a defect varying based on the operators. The method thus makes it possible to obtain a unique and objective result. Thus, the method is made simpler and secure.

What is claimed is:

1. A method for detecting a defect on a surface, the method comprising:
acquiring a plurality of images of the surface using an optical device having an optical axis, each image being acquired with a lighting of the surface along a lighting direction given for each point of the surface and with the optical axis of the optical device along a given optical direction, the images being acquired with different lighting directions or different combinations of lighting directions and/or with different optical directions;
for each point of the surface, calculating, from the acquired images, a plurality of parameters, the parameters including coefficients of an equation characterizing response of the point of the surface as a function of the lighting direction and an observation direction;

wherein, for each point of the surface, the calculation of the parameters includes: defining a quantity evolving as a function of the acquired images; choosing a model of the surface depending on the lighting direction(s) and/or the observation direction for the evolution of the quantity, the model including the coefficients, and calculating coefficients by regression of the evolution of the quantity; and deducing from the calculated parameters whether the surface has a defect at the point.

2. The detection method according to claim 1, wherein the optical direction is the same for the plurality of images.

3. The detection method according to claim 2, wherein the optical direction is substantially perpendicular to the surface.

4. The detection method according to claim 1, wherein the lighting is done by a lighting device, the lighting device including a first number of light sources, the first number being greater than six, each light source having a different lighting direction, for each acquired image, a single light source or a defined combination of sources being illuminated, the single light source or combination being different for each acquired image.

5. The detection method according to claim 4, wherein the light sources have an identical light intensity.

6. The detection method according to claim 4, wherein the light sources are arranged in a half-sphere surrounding the surface.

7. The detection method according to claim 4, wherein the lighting device includes one or several light sources that are configured for moving in a first number of positions relative to the surface.

8. The detection method according to claim 1, wherein the quantity corresponds to the gray intensity of the point of the surface, the model depending on the lighting direction.

9. The detection method according to claim 1, wherein the defect is detected at the point when at least one parameter at the point is not comprised in a defined interval.

10. The detection method according to claim 1, wherein the defect is detected at the point when at least one parameter at the point is not comprised in an interval centered around the mean value of the parameter on the set of points of the surface.

11. The detection method according to claim 1, wherein the defect is detected at the point when at least one parameter at the point differs from a value chosen as detection threshold relative to a background noise of the parameter at an adjacent point, the surface not having a defect at the adjacent point.

12. A device for detecting a defect on a surface, the detection device including:

an optical device having an optical axis, the optical device being configured to acquire an image of the surface along a given optical direction;

a lighting device having several different lighting direction; and an electronic calculating device, the electronic calculating device being configured to:

acquire a plurality of images of the surface via the optical device, each image being acquired along the given optical direction with different lighting directions or different combinations of lighting directions for each image, for each point of the surface, calculate, from acquired images, a plurality of parameters, the parameters including coefficients of an equation characterizing the response of the point of the surface as a function of the lighting direction and an observation direction;

wherein, for each point of the surface, the calculation of the parameters includes: defining a quantity evolving as a function of the acquired images; choosing a model of the surface depending on the lighting direction(s) and/or the observation direction for the evolution of the quantity, the model including the coefficients, and calculating coefficients by regression of the evolution of the quantity; and deduce from the calculated parameters whether the surface has a defect at the point.

* * * * *